Feb. 24, 1970  K. L. RUGGLES ET AL  3,496,612
APPARATUS FOR BONNET MOLDING OF SINKS
Filed May 2, 1967  3 Sheets-Sheet 1
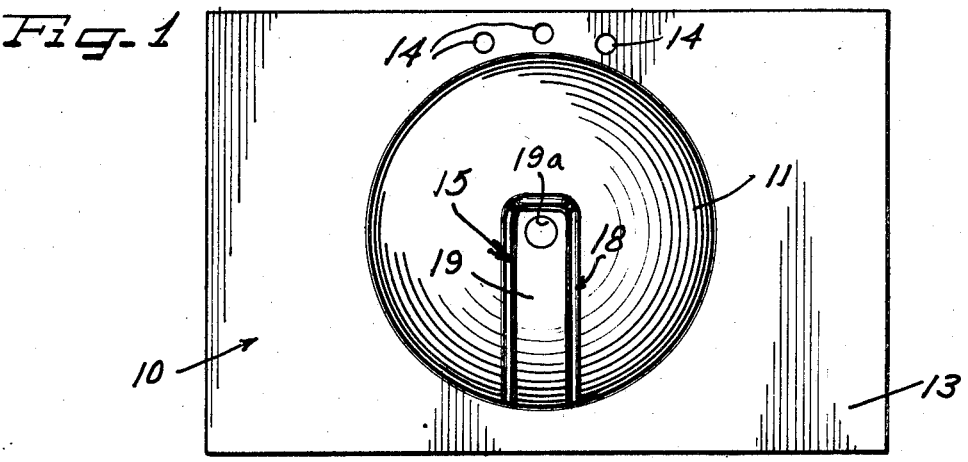
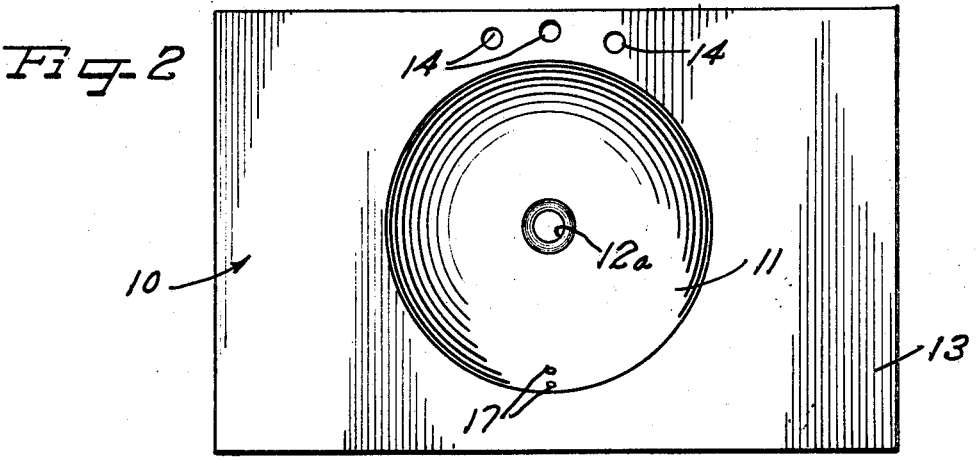
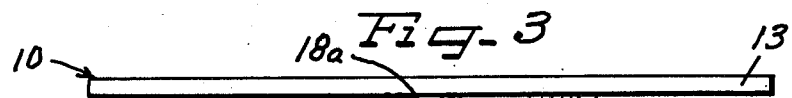
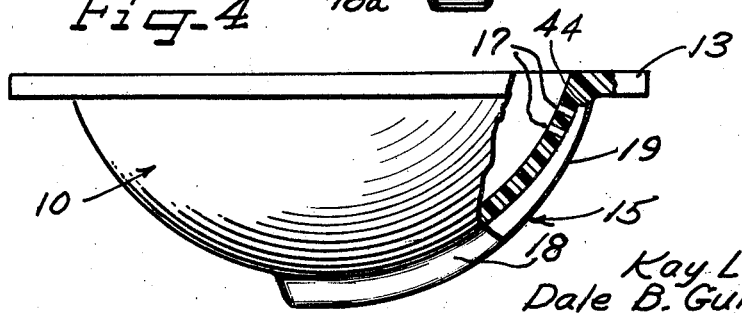
INVENTORS
Kay L. Ruggles
Dale B. Gunnerson
Howard S. Clark
BY Hill, Sherman, Meroni, Gross & Simpson
ATTORNEYS

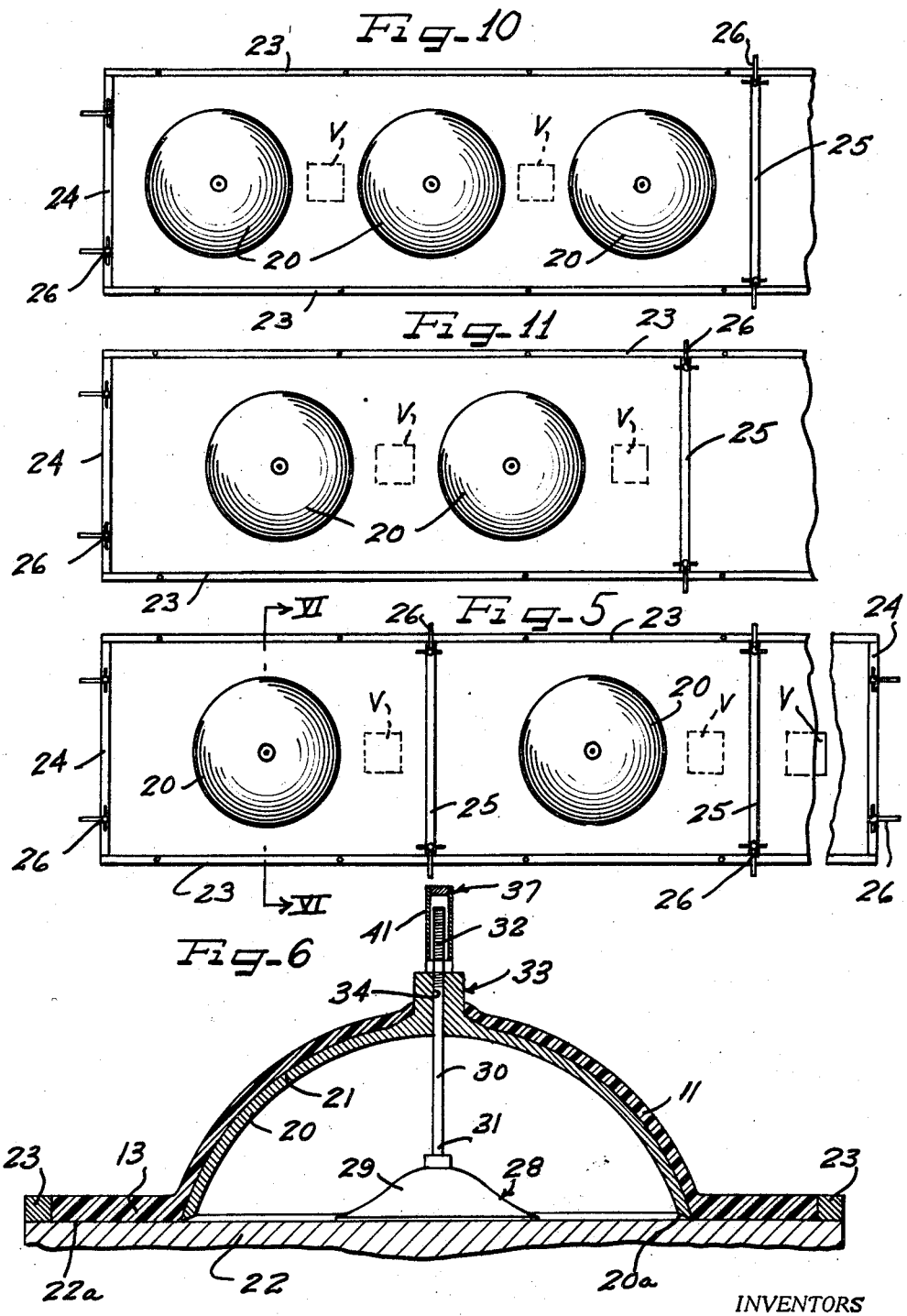

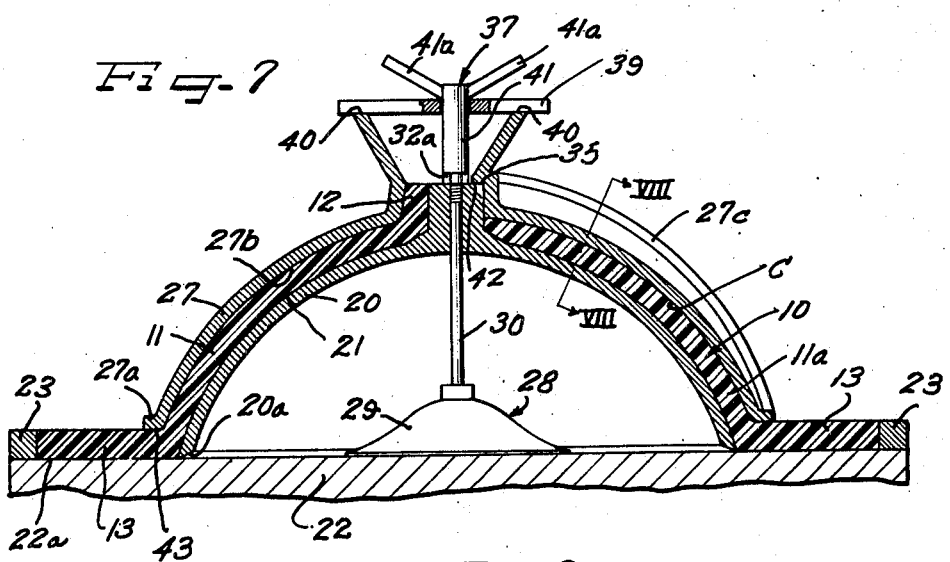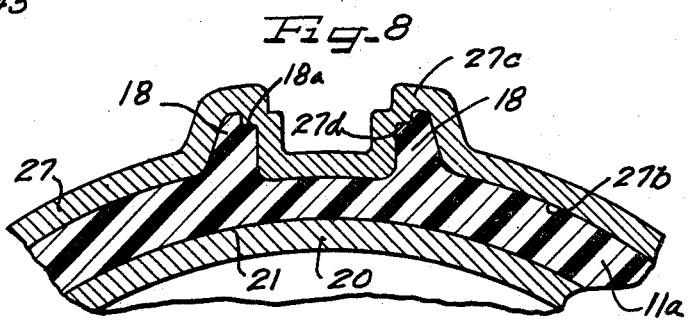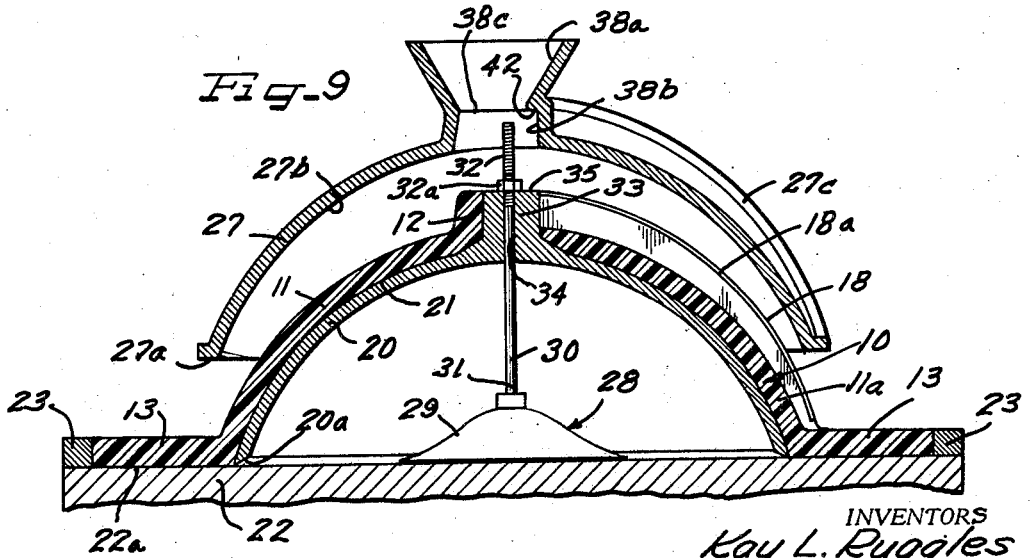

United States Patent Office 3,496,612
Patented Feb. 24, 1970

3,496,612
APPARATUS FOR BONNET MOLDING OF SINKS
Kay L. Ruggles, Dale B. Gunnerson, and Howard S. Clark, Salt Lake City, Utah, assignors, by mesne assignments, to American Standard Inc., New York, N.Y., a corporation of Delaware
Filed May 2, 1967, Ser. No. 635,477
Int. Cl. B29c 5/00
U.S. Cl. 18—39        11 Claims

ABSTRACT OF THE DISCLOSURE

An integral sink and vanity top combination of a thermo-setting synthetic plastic composition, preferably of a polyester resin type, wherein the bowl area is integrally formed with the vanity top area. The bowl area is provided with an overflow passageway that extends along the sidewall of the bowl. An apparatus for manufacture of the combination having one or more sink bowls is also disclosed and which method includes the steps of applying appropriate coating to the mold and thereafter applying an initial pour of the polyester resin into the mold, mounting an overflow tube in proximity to the bowl mold area, then applying a bonnet over the overflow tube and bowl area after the first pour has become tacky, and then making a second pour of the same material into the interior of the bonnet area over the first pour to form the bowl area to shape in integral assembly with the vanity top area. A mineral filler may be added to the resin for the initial pour to produce different desired finishes on the sink and vanity top combination. As the material is permitted to gel the mold is vibrated to permit entrapped gasses to escape to insure a product essentially free of pockets of entrapped air.

BACKGROUND OF THE INVENTION

Field of the invention

The field of invention to which this disclosure is directed pertains to an apparatus for manufacturing an integral sink and vanity top combination.

Description of the prior art

In the past, a number of different types of kitchen and bathroom sinks have been commercially marketed which have been of a metallic composition or of a ceramic composition. In the past, where resins have been used, the vanity top has been formed as a separate unit apart from the bowl, and attaching devices have been employed for mounting the bowls onto a countertop or vanity top. A large number of different systems have been utilized for attaching the bowl to the countertop, and it is well known that a great deal of difficulty has been encountered in an effort to develop a leakproof system of attachment of the bowl to the countertop of a type that can be conveniently installed and disassembled with a minimum of effort and expense. Also, difficulty has been encountered in providing a sink bowl of the type disclosed with a leakproof overflow passageway.

SUMMARY OF THE INVENTION

An important feature of this invention is concerned with an apparatus for forming an integral sink and vanity top combination wherein one or more sink bowls may be formed in integral assembly with the vanity top in a production line arrangement where the female mold surface can be positioned at selected intervals along the length of the table for ease of manufacture and to increase rates of production.

Yet a further object of this invention is to provide a new and improved apparatus for manufacture of sink and vanity top combinations where the expense of the apparatus may be substantially reduced and where production costs can be minimized.

Still another object of this invention is to provide a new and improved apparatus for manufacture of countertop and bowl combinations where tooling expense can be minimized while allowing great variation in design or shape of the combination and while further enabling the combination to be manufactured at improved production rates.

A further object of this invention is to provide an apparatus for making a new and improved sink and vanity top combination where the sink bowl is formed integral with the vanity top and wherein the overflow passageway can be conveniently formed on the side of the sink bowl.

Other objects and features of this invention will more fully become apparent in view of the following detailed description taken in conjunction with the accompanying drawings illustrating therein a single embodiment.

BRIEF DESCRIPTION OF THE DRAWINGS

FIGURE 1 is a bottom view of an integral sink and vanity top combination;
FIGURE 2 is a top plan view of the combination;
FIGURE 3 is a front edge elevation of the combination;
FIGURE 4 is a side elevation of the combination with parts broken away to show the overflow;
FIGURE 5 is a fragmentary top plan view of a portion of an apparatus for the manufacture of integral sink and vanity top combinations;
FIGURE 6 is a vertical section of a portion of the apparatus taken generally on the line VI—VI, looking in the direction of the arrows as seen in FIGURE 5, only showing certain parts in elevation and illustrating a portion of our method of forming the combination;
FIGURE 7 is a vertical section with a bonnet shown in assembly with the apparatus shown in FIGURE 6 and illustrating a subsequent portion of our method;
FIGURE 8 is an enlarged fragmentary vertical section taken substantially on the line VIII—VIII looking in the direction indicated by the arrows as seen in FIGURE 7;
FIGURE 9 is an exploded view similar to FIGURE 7 only illustrating the manner in which the bonnet is removed from the mold after the poured material has gelled; and
FIGURES 10 and 11 are top plan views similar to FIGURE 5 only with the transverse bars in varied positions for manufacture of two and three bowl sink and vanity top combinations.

DESCRIPTION OF ONE PREFERRED EMBODIMENT

Apparatus for manufacture of monolithic sink and vanity top combinations

The reference numeral 10 indicates generally an integral sink and vanity top combination embodying certain important features of this invention. The combination includes a sink bowl area 11 having an outlet 12a defined by the sink bowl boss 12. Integral in one piece with the sink bowl area 11 is a vanity top 13 (FIGURE 1). At the rear side of the bowl area are a series of openings 14 for the plumbing fixtures. Mounted on the front side of the bowl is an arcuate overflow tube area 15. The side wall of the bowl has an overflow outlet, as indicated at 17, in communication with the overflow passageway 15 to permit fluids to be drained through the overflow outlet 17 and then discharged through the sink outlet 12a. The passageway 15 is defined by a raised or rib area 18 provided on an outer side wall 11a of the sink 11. An arcuate closure strip or piece 19 is joined with the rib area 18 to enclose the passageway 15. The piece 19 can be made from any suitable material, and excellent results are obtained by using a piece made of fiber glass.

As illustrated in FIGURES 5 and 6, the apparatus for manufacture of the combination 10 includes a lower bonnet 20 having a female mold surface 21 of an inverted sink bowl. A large smooth table top 22 having a table top mold surface 22a is provided and the lower bonnet 20 is mounted thereon. As shown, the table top 22 has fixed longitudinal dikes or strips 23 that extend the length thereof. Also, at opposite ends of the table top are a pair of transverse dikes or strips 24 which cooperate with the longitudinal strips 23 to contain any material poured onto the mold area. Intermediate of the transverse strips are a series of polished metal transverse bars 25 which are movable longitudinally along the length of the table top 22 to permit vanity tops to be poured having variable longitudinal dimensions. The bars when used also cooperate as a part of the means to contain the poured material on the mold surface 22a. These strips 24 and the bars 25 are adjustable by releasing C-clamps 26 and moving the strips 24 and/or the bars 25 longitudinally to adjusted positions and then securing them by means of the C-clamps 26. The height of the dikes and bars, as illustrated, corresponds to the thickness of the vanity top 13. In addition to the lower bonnet 20, the mold apparatus includes a generally hemispherical upper bonnet 27 that is used as a mold that determines the back side surface of the sink mold. The thickness of the bowls is the measure of the cavity between the bonnets when the upper bonnet 27 is aligned and clamped with the lower bonnet 20.

The lower bonnet 20, according to our invention, is provided with means 28 for detachably securing the lower bonnet to the table top 22 at any selected position. Variations of positions can be readily made and the lower bonnet can be positioned close to the edge of the table top and the bonnets can also be positioned closely together, if desired.

The means 28 includes a rubber suction cup 29 and a stem 30 which is suitably secured at its lower end 31 with the suction cup 29. The stem 30 has a threaded upper end 32 that extends above the lower bonnet 20 and above means 33 comprising a boss which is generally centered relative to the lower bonnet mold surface 21 in the illustrated embodiments. The boss 33 has a bore 34 through which the stem 30 extends.

The boss 33 has an upper bonnet support shoulder 35 for supporting the upper bonnet a desired distance above the lower bonnet 20. The boss 33 also serves as means for forming the drain outlet 12a.

In order to provide an adjustment for the suction cup 29, the upper threaded stem end 32 is provided with an adjustment nut 32a (FIGURE 9). The nut 32a can be moved up and down on the stem for varying the position of the suction cup 29 with relation to an outer lower bonnet rim 20a that is adapted to engage the table top 22. The nut 32a also coacts in the lower bonnet 22 and the suction cup 29 functions to snugly engage the lower bonnet rim 20a against the table top 22.

In the process of using the apparatus for manufacture of integral sink and vanity top combinations, the end casting bars 24—24 are placed on the table 22 and the bars 25 are positioned at intervals corresponding to the desired lengths of the vanity tops. The ends of the bars 24 and the transverse bars 25 are squared in relation to the dikes or strips 23 in production of the combinations like those illustrated, although it will be appreciated the vanity top may be irregularly shaped at its perimeter if an irregularly shaped countertop is desired. The transverse bars and strips 24 and 25 are then clamped to the table top to hold them in adjusted position. FIGURES 10 and 11 illustrate modifications only to the extent of illustrating how the position of the transverse bars 25 and the lower bonnets 20 can be varied to produce sink bowl and vanity top combinations of different shapes. By using the apparatus shown in FIGURE 10 a three bowl vanity top combination can be produced, while in FIGURE 11 a two bowl vanity top combination can be manufactured.

The bonnet surface 21, the table top surface 22a and upper bonnet inner surface 27b are then cleaned, waxed and sprayed with a release agent. The bowl mold area 21 and the table top area 22a are then gel-coated.

Prior to the securement of the upper bonnet 27 on the lower bonnet 20, the molding mix is then prepared, as later described herein, and then poured over the lower bonnet mold area or surface 21 and the table top mold area 22a. This pour can be made along the entire length of the table top 22 so that a plurality of sink and vanity top combinations can be contemporaneously poured. The material poured over the bowl mold area will remain on the bowl surface to the thickness of only ⅛" to 3/16" while the table top mold area 22a may be poured to a depth of ¾", as desired. The first mix is then allowed to gel until firm for no more than 30–40 minutes. As the mix is allowed to become firm the table is vibrated by vibrator V until the mix is gelled. The upper bonnet 27 is then clamped over the bonnet 20 before the mix is gelled and held in position by clamps 37.

The upper bonnet has a pour funnel 38 centered relative to the lower bonnet boss 33 and the drain outlet 12a being formed and the threaded upper end 32 of the stem 30 projects upwardly into the opening defined by the funnel 38. A clamp bar 39 is supported by upper edge portions 40. The bar 39 extends only over a portion of the opening defined by the funnel 38 so that material can be poured through the funnel. A clamp nut 41 having wings or arms 41a is threaded onto the upper stem end 32 with the arms 41a bearing against the clamp bar 39 to secure funnel shoulder 42 in fixed secured engagement against the upper bonnet support shoulder 35.

It will be noted that when the upper bonnet 27 is mounted in position for the final pour, its lower outer bonnet rim 27a is seated on the top side of the table top material previously poured, as indicated at 43. In order to obtain a seal between the upper bonnet rim 27a with the material previously poured at 43, the upper bonnet should be clamped in position while the mix comprising the initial pour is in a liquid state, i.e., before it becomes tacky, so that a seal may be established between the outer rim 27a of the bonnet 27 at 43 to prevent the mixture comprising the second pour from escaping at the outer rim juncture of the upper bonnet 27 at 43.

In order to form the rib area 18 on the outer side wall 11a of the sink, the upper bonnet 37 is provided with an offset upper bonnet rib area 27c which extends from the outer rim 27a to the funnel 38. The upper bonnet is further provided with a continuous bonnet rib shoulder 27d at the inside of the bonnet rib area 27c. The shoulder 27d is continuous so that the entire margin of a closure piece can be secured therewith in sealed relation.

A measured second mix is then poured into a funnel 38 and a cavity C between the bonnets 20 and 27 is then filled with the second mix. The vibrator V is operated to settle the mix in the cavity C. The vibrator may be of any suitable type.

The material comprising the first and second mixes is then allowed to cure for a minimum of 3 to 4 hours, and overhead heaters can be utilized to accelerate the hardening process. Once the combination 10 has been fully cured, the upper bonnet 27 is unclamped and removed from the table top, as shown in FIGURE 9. Due to the angular configuration of the funnel surfaces, as indicated at 38a and 38b, any excess material at the outlet of the sink bowl may be broken free and removed with the upper bonnet 27. It will be noted that the internal funnel surface 38a has a larger diameter at an upper end of inner funnel surface 38b and a small diameter at its juncture with funnel surface 38a than at its lower end. In view of the shape of these inner funnel surfaces 38a and 38b, the excess material is generally broken at the juncture of the inner funnel surfaces, as indicated at 38c (FIGURE 9).

In order to remove the formed combination from the table top the end casting bars 24 are detached from the table. After the combination has been removed from the mold, it is finished by grinding any excess material from the outlet boss 12. The overflow holes 17 are then bored, as shown in FIGURE 1. Still further, the drain outlet 12a may also be bored, if necessary. Thereafter, the arcuate closure strip 19 is secured by means of a suitable mastic 44 to the continuous rib shoulder 18a in sealed assembly therewith and an opening 19a is bored in the strip connected with the sink bowl outlet 12a.

Formulations for filled polyester mix used in integral sink and vanity combinations In connection with the mixtures used in the first and second pours previously described, it will be appreciated that the same mixture can be used throughout, if desired. In other words, both pours can be of a solid color mix or both pours can be made of a marble mix, if desired. Preferably, however, the first pour is made with a marble mix which includes pigmenting material for creating a desired marbelized effect in the upper surface of the vanity top. Various types of pigmenting materials may be used to achieve different pigmented effects in the upper surface of the vanity top. Listed below are three different mixes which can be used with excellent results, depending on the type of product or combination to be produced.

(I) Marble mix for first and second pours (a) Base mix:                                                  Percent
  (1) Polyester, epoxy or other thermosetting resin _____ 30-35
  (2) 140-150 mesh ground silica flour _____ 20-35
  (3) Onyx sand fines, 150 to 10 mesh random selection _____ 30-30
  (4) Colloidal silica (thixotropic agent) ____ .2
  (5) Inorganic pigment _____ 4-6
(b) Marble veining mix:
  (1) Polyester, epoxy or other thermosetting resin _____ 30
  (2) Onyx sand fines, 150 to 10 mesh random selection _____ 60
  (3) Inorganic pigment _____ 10

(II) Solid color mix for first and second pours (a) Polyester, epoxy or other thermosetting resin _____ 30-35
(b) 60 mesh silica sand _____ 20-35
(c) 140-140 mesh ground silica flour _____ 20-35
(d) Colloidal silica thixotropic agent _____ .2
(e) Inorganic pigment _____ 4-6

(III) Aggregate mix for first and second pours (a) Polyester, epoxy or other thermosetting resin _____ 30-35
(b) Natural colored aggregate #0 size to 16 mesh _____ 20-35
(c) 140 mesh ground silica _____ 20-35
(d) Colloidal silica thixotripic agent _____ .2-.5
(e) Inorganic pigment The features of the above formulations are:
(1) Improved physical properties of the cast material through the use of silica fillers.
(2) Stain moisture resistance is excellent as silica is non-absorbent and inert.
(3) Heat resistance (cigarette burns) is increased through using silica which acts somewhat as a heat sink and is inert.

Typical physical properties are:

Tensile _____ p.s.i__ 1,500
Compression _____ p.s.i__ 13,000
Hardness (Barcol) _____ 55-60
Abrasion resistance (g. w/H18 wheel) _____ 1.93

The use of various meshes of filler allows proper stacking of the agregate to reduce settling or classification due to mold vibration. The colloidal silica is used as an additive also to prevent settling. Settling is not desired as it will unbalance the cast material, i.e., the lower surface will have a different density than the upper surface. This will also change the resin content through the strata of the casting. As resin shrinks 5-7% during cure, any change of resin content through the casting will cause differential forces to be present during cure. This will result in the part being warped unless restrained either by a matched mold or fixtures or through the shape of the part itself, i.e., two-way curvature.

The use of heavier aggregate in the marble mixture tends to break up the marble veining into a more decorative effect and approaches a natural look.

The top surface of the vanity can be made to simulate marble, travertine, slate or other natural textures by the use of different types of so-called veining mixture.

There is considerable advantage, from one standpoint of increasing the production rate of sink and vanity top combinations, in providing a table which may be 30 to 40 feet long having a series of female molds each with means for securing the female molds and the upper bonnets at selected intervals for the manufacture of combinations with bowl areas positioned at various positions on the vanity top such as close together or close to one side or edge of the vanity top associated therewith. The transversely spaced bars 25 can be variously adjusted so that a series of sink and vanity top combinations can be contemporaneously formed and so that relative position of the bowl or bowls on the vanity top can be customized. The disclosed molds enable ten or more sink and vanity combinations to be contemporaneously formed, as desired, and each combination can be quite different in specifications. Not only can the position of the bowls be varied but also the length and/or shape of the vanity top.

One of the important advantages and features of the method here disclosed relates to our discovery that when the first and second pours of material are made in the manner described and where the second pour is applied to the first pour after the first pour becomes tacky, a complete bonding of the two pours occurs so that a single homogeneous combining of the materials of the first and second pours occurs. On examination of the finished product it is found that the materials of the first and second pours have completely merged together so that the resulting product is free of laminations and comprises a single layer om material. It has been found that the one-layered combination is not only attractive in appearance but also has great strength, thus enabling the product to be well adapted for use in its intended manner.

Although minor modifications might be suggested by those versed in the art, it should be understood that we wish to embody within the scope of the patent warranted hereon, all such modifications as reasonably and properly come within the scope of our contribution to the art.

We claim:
1. An apparatus for forming a plurality of sink bowl and vanity combinations comprising
  a lower bonnet including a table,
  a series of female molds each having means for attaching the associated female mold to said table at selected intervals along the length of the table,
  means cooperable with the table disposed peripherally of said female molds for entrapping material poured onto the table for forming vanity tops,
  a series of upper bonnets each cooperable with one of said female molds and each having a pour spout for forming the sink bowl, means for supporting said upper bonnets over said lower bonnets with a lower rim of the upper bonnet positioned in adjacency to the table permitting the rim to be engaged with the level of material contained by the means which entraps the material poured onto the table in the formation of the vanity top, means for vibrating the molds, and means for releaseably securing the upper bonnets in fixed position relative to said lower bonnets.

2. The apparatus of claim 1 further characterized by said means for attaching the male mold to the table comprising suction cups.

3. The apparatus of claim 1 further characterized by said means for attaching the male molds to the table comprising suction cups, each of said cups being joined with said male molds by attachment stems.

4. The apparatus of claim 1 further characterized by said means for attaching the female molds to the table comprising suction cups, each of said cups being joined with said female molds by attachment stems, said means for securing said upper bonnets over said lower bonnet including threads on said stems and clamps bearing against said upper bonnets and in threaded engagement with the threads on the stems.

5. The apparatus of claim 1 further characterized by said means for attaching the female molds to the table comprising suction cups, each of said cups being joined with said female molds by attachment stems, said means for supporting said upper bonnets over said lower bonnets including support shoulders on said female molds with said upper bonnets supported thereon.

6. The apparatus of claim 1 further characterized by said means for attaching the female molds to the table comprising suction cups, each of said cups being joined with said female molds by attachment stems, said means for supporting said upper bonnets over said lower bonnets including support shoulders on said female molds with said upper bonnets supported thereon, said means for securing said upper bonnets over said lower bonnet including threads on said stems and clamps bearing against said upper bonnets and in threaded engagement with the threads on the stems thereby rigidly securing the upper bonnets against said support shoulders.

7. The apparatus of claim 1 further characterized by said means cooperable with said table including a series of transversely extending strips, and releasable means for securing the transversely extending strips at selected intervals along the length of the table for varying the size of the vanity tops.

8. An apparatus for forming a sink bowl and vanity top combination comprising a lower bonnet including a table, a female mold having means for attaching the female mold to said table at various positions for enabling the position of the bowl to be varied relative to the table and to the vanity top being formed, means cooperable with the table disposed periherally of said female molds for entrapping material poured onto the table for forming the vanity top, an upper bonnet cooperable with said female mold for forming the sink bowl therebetween and with said upper bonnet having a lower outer rim positioned for permitting the rim to be engaged with the level of material contained by said means for entrapping material to permit the bowl and vanity top to be formed as an integral one piece unit, means for supporting said upper bonnet over said lower bonnet, means for vibrating the molds, and means for releasably securing the upper bonnet in fixed position relative to said lower bonnet.

9. An apparatus for forming a sink bowl and vanity top combination comprising a lower bonnet having a smooth top mold surface and further including a female mold havings means for detachably securing the female mold on said top mold surface, means cooperable with said top mold surface for containing poured mixture thereon for providing a vanity top mold, an upper bonnet for overlying the female mold and having a pour spout cooperable with said female mold to permit a mold cavity therebetween to be filled and with the female mold bonnet having means cooperable therewith for supporting said upper bonnet in net in a supported position over said female mold surface, clamp means for securing the upper bonnet in clamped position over said female mold, and means for vibrating mixture poured onto the mold surface and the female mold.

10. The apparatus of claim 9 further characterized by said means for supporting said upper bonnet comprising a support shoulder overlying a female mold surface provided by said female mold, the upper bonnet having an upper bonnet supporting shoulder engaged with and supported by said support shoulder.

11. The apparatus of claim 10 further characterized by said means for clamping said upper bonnet to said lower mold including a clamp handle projected through said funnel and cooperable with said lower mold at the area of its support shoulder.

References Cited

UNITED STATES PATENTS

| 296,097 | 4/1884 | Woeber | 18—39 XR |
| 1,214,530 | 2/1917 | Ferguson | 25—41.4 |
| 1,882,191 | 10/1932 | Purinton | 249—105 XR |
| 2,346,626 | 4/1944 | Thompson | 249—58 |
| 2,526,993 | 10/1950 | Bower | 25—129 |
| 2,844,857 | 7/1958 | Jones | 18—39 XR |
| 3,103,428 | 9/1963 | Stello et al. | 249—142 XR |

WILLIAM J. STEPHENSON, Primary Examiner

U.S. Cl. X.R.

25—29; 249—142